United States Patent [19]

Cerdonio et al.

[11] Patent Number: 5,066,637
[45] Date of Patent: Nov. 19, 1991

[54] GYROMAGNETIC-EFFECT CRYOGENIC GYROSCOPE FOR DETECTING ANGULAR VELOCITY

[75] Inventors: Massimo Cerdonio, Noventa di Piave; Stefano Vitale, Trento, both of Italy

[73] Assignee: AERITALIA -Società Aerospaziale Italiana S.p.A., Turin, Italy

[21] Appl. No.: 210,432

[22] Filed: Jun. 23, 1988

[30] Foreign Application Priority Data

Jun. 23, 1987 [IT] Italy ................. 67544 A/87

[51] Int. Cl.[5] .............. G01P 9/00; G01P 3/44; G01C 19/00; G01R 33/035
[52] U.S. Cl. ............................ 501/1; 73/504; 74/5 R; 324/160; 324/163; 324/248; 505/842; 505/872
[58] Field of Search ............ 324/160, 163, 173, 174, 324/248; 73/504, 505; 33/304, 316, 317 R, 318, 319, 355, 362, 363 R; 74/5 R; 505/842, 872

[56] References Cited

U.S. PATENT DOCUMENTS

| | | | |
|---|---|---|---|
| 3,220,262 | 11/1965 | Thompson | 73/505 |
| 3,297,948 | 1/1967 | Kohler | 324/173 |
| 3,673,872 | 7/1972 | Ensley | 73/505 |

OTHER PUBLICATIONS

"Dizlonario D'Ingegnelia", pp. 934-938, Federico Filippi, X RIP-5, Unione Tipografico-Editrice Torinese.

"Encyclopedia of Chemical Technology", 3rd Ed, vol. 22, Ed, vol. 22, Kirk-Othmer, pp. 298, 331.

Brady, R. M., *A Superconducting Gyroscope with no Moving Parts*, IEEE Transactions on Magnetics, vol. MAG-17, No. 1, Jan. 1981, pp. 861, 862.

*Primary Examiner*—Gerard R. Strecker
*Attorney, Agent, or Firm*—Sughrue, Mion, Zinn, Macpeak & Seas

[57] ABSTRACT

A cryogenic gyroscope for detecting the angular velocity of a rigid system without reference to an external inertial system comprises a closed rigid casing made of a sueprconducting material and kept below its critical superconducting temperature, for example, by immersion in a bath of liquid helium. A rotation-detector device is situated within the superconductor casing. This device, which is rigidly supported by the wall of the casing, includes at least one component of ferromagnetic material, constituted by a plurality of ferromagnetic strips intercalated with layers of electrically-insulating material.

4 Claims, 3 Drawing Sheets

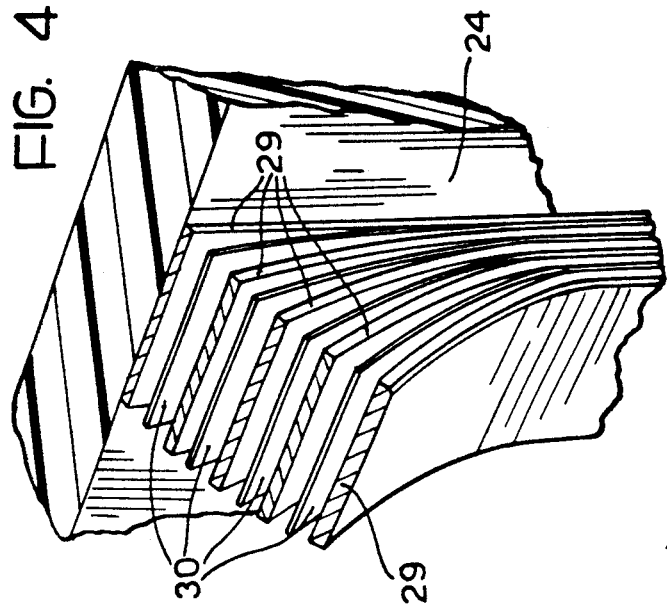
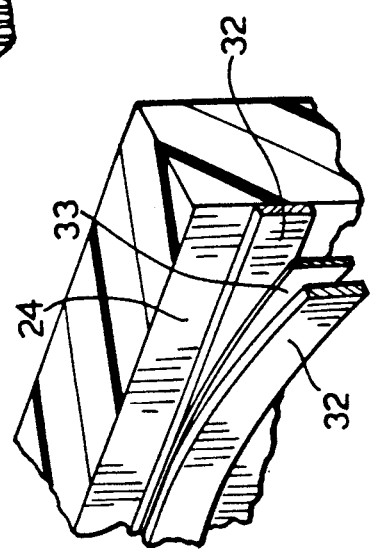
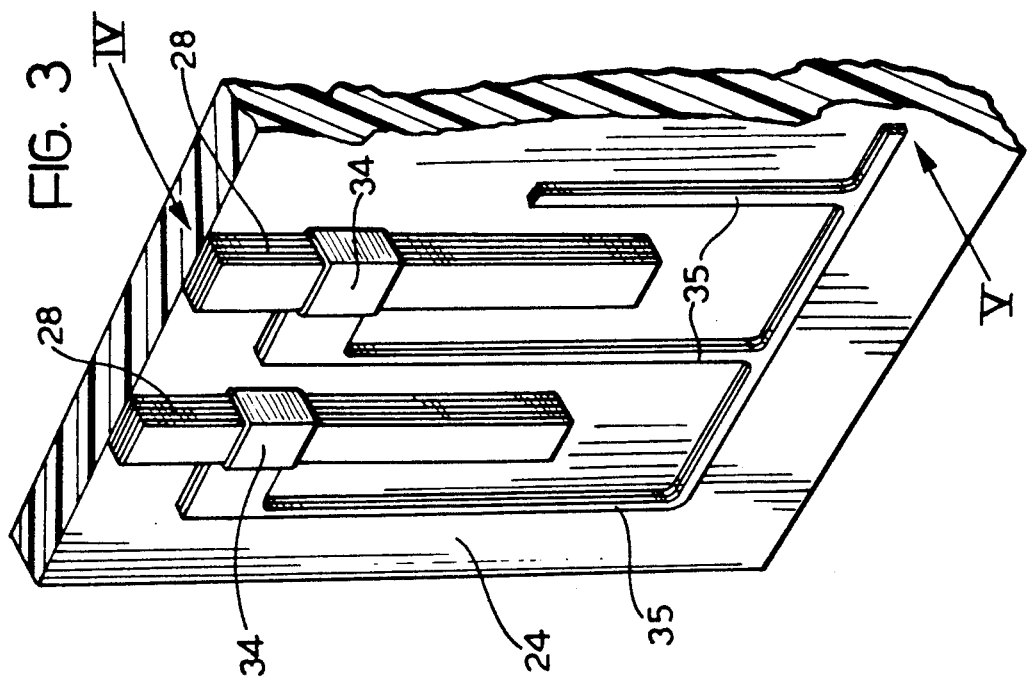

GYROMAGNETIC-EFFECT CRYOGENIC GYROSCOPE FOR DETECTING ANGULAR VELOCITY

BACKGROUND OF THE INVENTION

The present invention relates to a cryogenic gyroscope, that is a device for detecting the angular velocity of rotation of a rigid system without reference to an external inertial system, which makes use of the properties of superconducting materials, that is, materials whose electrical resistance becomes zero at relatively low thermodynamic temperatures, of the order of a few degrees Kelvin, or even higher (in the case of more recently developed superconducting materials), of the order of 100° K. The future development of materials which are superconducting at ambient temperature is also envisaged.

SUMMARY OF THE INVENTION

The object of the invention is to produce a gyroscope of the type indicated above, which does not have moving parts and which is very accurate so that it can be used to advantage and economically even in space vehicles, for example.

In order to achieve this object, the invention provides a cryogenic gyroscope, characterized in that it comprises:

a closed rigid casing made of a superconducting material, means for keeping the casing at a temperature no higher than its critical superconducting temperature, and a rotation-detector device supported rigidly within the casing by the walls thereof and comprising at least one component of ferromagnetic material constituted by a plurality of ferromagnetic strips intercalated with layers of electrically-insulating material and a SQUID magnetometer associated with the component of ferromagnetic material for emitting signals indicative of the magnetization of the ferromagnetic component as a result of a rotation of the casing.

When the superconducting casing rotates, the ferromagnetic component rotates with it since it is supported rigidly by the wall of the casing. Assuming that the ferromagnetic component is initially unmagnetized, its rotation causes it to become magnetized to a corresponding extent due to the so-called Barnett effect. To this magnetization must be added that caused by the magnetic field created within the superconducting casing due to the fact that this casing also becomes magnetized when it rotates.

As will be explained in more detail below, the fact that the superconducting material has a different gyromagnetic ratio from that of the ferromagnetic component situated within the casing means that the net magnetization of the ferromagnetic component, which is measured by the SQUID magnetometer, is other than zero. This magnetization is related to the angular velocity at which the superconducting casing rotates so that its measurement enables a measure of the angular velocity of the rotation to be derived. Any magnetic fields outside the casing have no effect on the magnetization of the ferromagnetic element since the superconducting casing acts as a screen which is impermeable to such magnetic fields due to the so-called Meissner effect of superconducting materials.

BRIEF DESCRIPTION OF THE DRAWINGS

Further characteristics and advantages of the invention will become clear from the detailed description which follows with reference to the appended drawings, provided purely by way of non-limiting example, in which:

FIG. 3 is a partially-sectioned perspective view of the detail III in FIG. 2, on an enlarged scale, FIG. 4 is an exploded perspective view of the detail IV of FIG. 3, on an enlarged scale, and FIG. 5 is an exploded perspective view of the detail V of FIG. 3, on an enlarged scale.

DETAILED DESCRIPTION OF THE INVENTION

Figure 1:
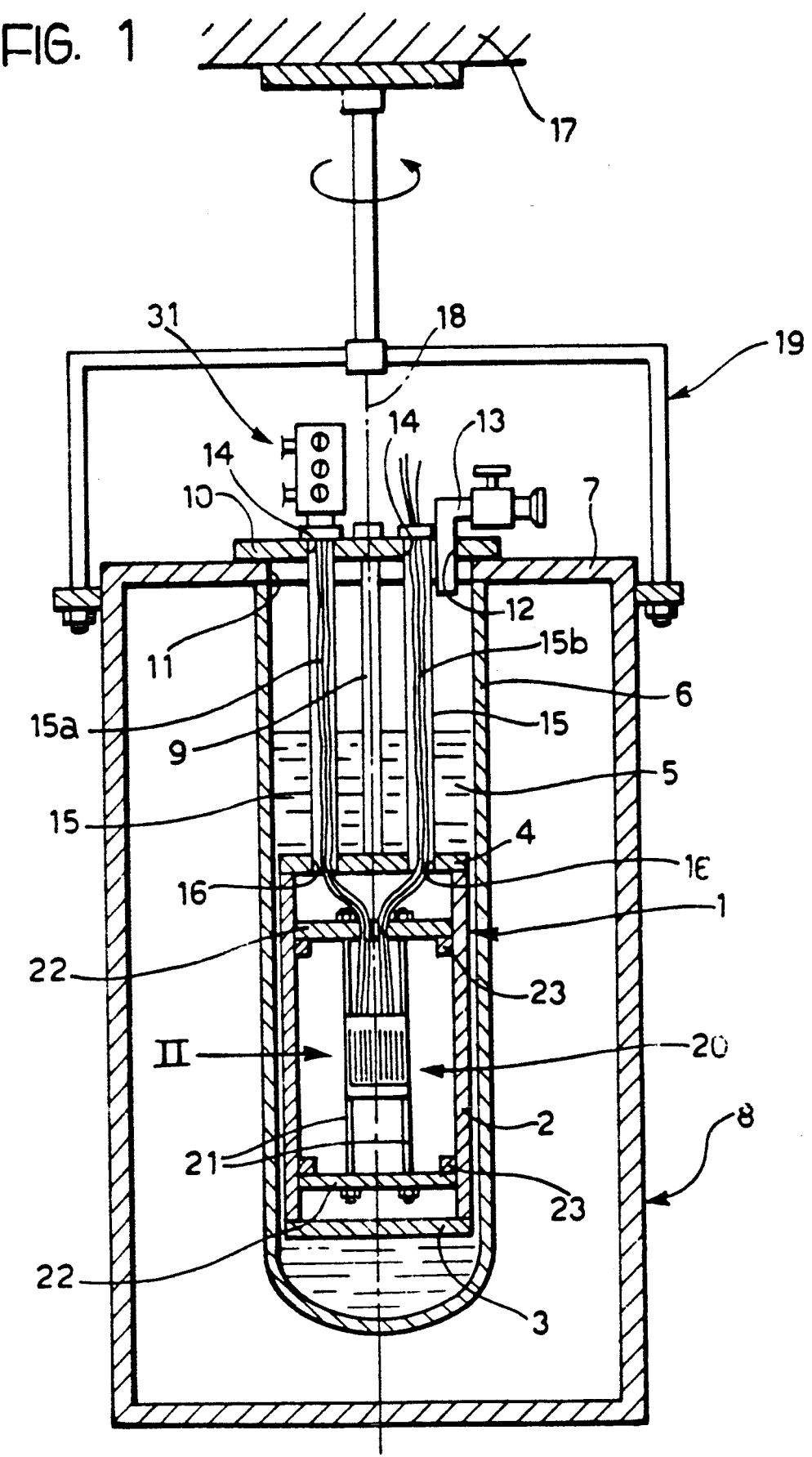
FIG. 1 is a sectioned elevation of a preferred embodiment of the gyroscope according to the invention.
Figure 2:
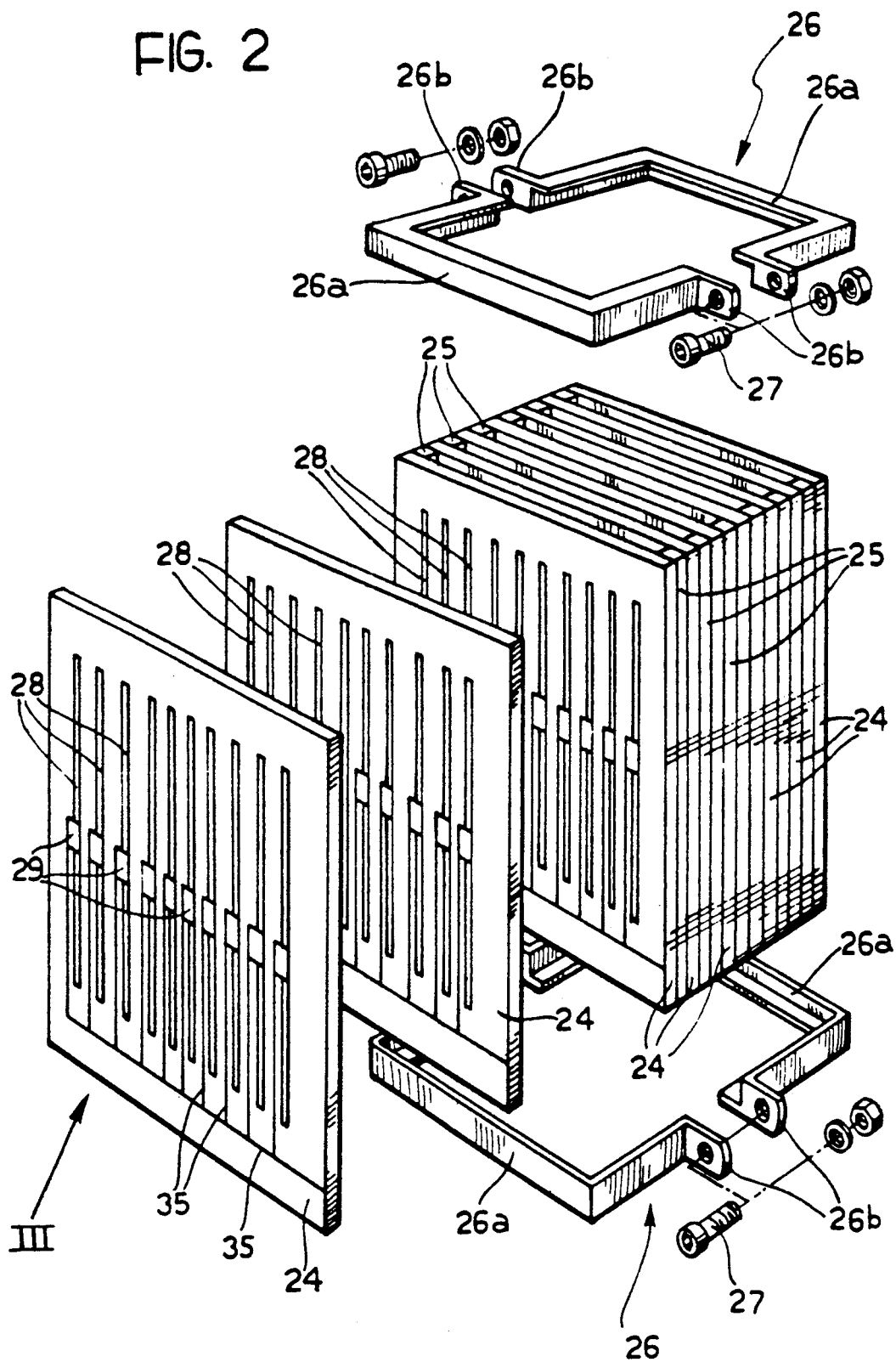
FIG. 2 is an exploded perspective view of the detail II in FIG. 1, on an enlarged scale.

In FIG. 1, a closed, rigid, cylindrical casing made of a superconducting material is generally indicated 1. In the embodiment illustrated, the casing comprises a cylindrical wall 2, closed at its ends by two walls 3 and 4 which are fixed to the wall 2 by any type of connecting means. As already mentioned above, superconducting materials are those whose electrical resistance becomes zero at very low thermodynamic temperatures (of the order of a few degrees Kelvin) or even higher (in the case of more recently-developed superconducting materials) of the order of 100° K. The future development of materials which are superconducting at ambient temperature and which could obviously also be applied with advantage to the present invention, is not excluded.

In the embodiment illustrated, the superconducting casing 1 is kept below its critical superconducting temperature by means of a bath 5 of liquid helium in which it is immersed. The bath 5 is contained within a cylindrical container 6 which is open at the top and connected by any type of connecting means (not illustrated) to the upper wall 7 of an outer container 8. The casing 2 is kept suspended within the container 6 by means of a rod 9 whose lower end is fixed to the upper wall 4 of the casing 1 and whose upper end is connected to a plate 10 which is fixed to the wall 7 of the outer container 8 and which fits over and closes a central aperture 11 in the wall 7. Still with reference to the embodiment illustrated, the plate 10 has a hole 12 for the passage of a tube 13 for supplying the liquid helium and holes 14 for the passage of two protective tubes 15 through which electrical cables 15a and 15b pass for connecting the devices within the casing 1 to an electronic device 31 (which will be described below) and to other control devices (not illustrated). The ends of the tubes 15 furthest from the plate 10 are inserted in two holes 16 in the upper wall 4 of the casing 1.

When the gyroscope according to the invention is to be fitted, for example, on board a space vehicle, the outer container 8 may be mounted directly on the structure of the vehicle. In the case of laboratory testing, to which FIG. 1 of the appended drawings relates, however, the outer container 8 is suspended by means of a support 19, from a wall 17 so that it can rotate about its principle axis 18.

A rotation detector device 20 is situated within the superconducting casing 1 and is connected rigidly to the wall of the casing. In the embodiment illustrated, the device 20 is fixed to tie-rods 21 clamped at their ends to two discs 22 which are pressed against annular abutments 23 provided on the inside of the wall 2.

The rotation detector device 20 is illustrated more clearly in FIGS. 2-5 of the appended drawings. In the embodiment illustrated, this device comprises a pack of quartz plates 24 superposed so as to form a parallelepipedal block. The plates 24 are spaced from each other by spacer fillets 25 and are clamped by means of a pair of end frame members 26 located at the ends of the block and which grip the plates 24 and the spacer fillets 25 between them. Each frame 26 is constituted by two U-shaped elements 26a having end flanges 26b for engagement by the bolts 27.

With reference to FIGS. 3-5, a series of ferromagnetic bars 28 is applied to one face of each quartz plate 24. Each bar 28 is constituted by a plurality of ferromagnetic strips 29 (FIG. 4) intercalated with strips of insulating material 30. This lamination is carried out for reasons which will be made clear below. The application of the ferromagnetic strips may be achieved, for example, by thin-film deposition, or by the juxtaposition of glued metal strips, or even by the fine dispersal of magnetic powder in insulating matrices. These techniques are known, and are not therefore described in detail in the present description.

A band of superconducting material 34 is wound around each bar 28. The superconducting windings 34 are all connected in parallel by means of conductors 35 to a SQUID magnetometer, of known type, whose electronic unit is indicated 31 in FIG. 1. As shown more clearly in FIG. 5, each conductor 35 is constituted by two layers of superconducting material 32, between which a layer of insulating material 33 is interposed. The SQUID magnetometer associated with the unit 31 is intended to provide a signal indicative of the magnetization of the bars 28 and, consequently (for reasons which will be explained below), of the angular velocity at which the container 8 is rotating about its axis 18.

SQUIDs (Superconducting Quantum Interference Devices) are magnetometers which are able to detect variations in magnetic induction, and are constituted essentially by systems with double superconductor junctions.

These devices are of known type and will not therefore be described in detail below.

The conductors 35 associated with the superconducting windings 34 define the primary winding of a superconducting transformer whose secondary winding may be coupled inductively to the SQUID. Alternatively, the bars 28 may be coupled directly to the windows of a multi-window radiofrequency SQUID. This type of SQUID, which is also known, has already been used for various applications.

The basic theoretical principles and the operation of the gyroscope according to the invention will be described below.

It is known that all magnetic materials, if rotated at a uniform angular velocity OMEGA become magnetized due to the gyromagnetic effect, also known as the Barnett effect, with a magnetization proportional to OMEGA. This magnetization is the same as that produced if the material were kept still in an inertial system and a magnetic field $H = $ gamma OMEGA were applied, where gamma is a constant which depends on the nature of the material. Thus for ferromagnetic materials, whose magnetic polarization is caused mainly by the "spin" of the electrons, gamma$=2mc/$ge, the experimental values of g being approximately 2. Deviations of g from the value 2 show the extent to which the orbital movement of the electrons contributes to the magnetic polarization. For superconducting materials $g=1$ and thus gamma$=2mc/e$ since the magnetic phenomena in this case are due to orbital contributions and not to the spin of pairs of electrons which have a zero total spin (Cooper pairs). In the equations given above, m and e are the mass and the charge respectively of an electron and c is the speed of light. The ratio mc/e is thus approximately $-5.7 \times 10^{-8}$ gauss sec/rad.

The device according to the invention is based on the concept of the very precise measurement of this magnetization with the use of a SQUID magnetometer and the use of this measurement as a measure of OMEGA. This, however, is not possible in an environment which is not well screened from true magnetic fields. It will, in fact, be noted that, given the low value of the ratio mc/e, for the angular velocities concerned in these applications (less than one radian per second), the rotations are equivalent to magnetic fields which are a great deal weaker than ambient magnetic fields and variations therein. The necessary degree of attenuation of the magnetic field or of its variations is such as to be obtainable only with closed, superconducting screening. As already indicated above, the space within a closed superconducting casing is not affected by external magnetic fields because of the so-called Meissner effect. However, if a material which, like the superconductor has a value of gamma$=2mc/e$, is placed in a closed superconducting screen, the net magnetization of the material situated within the screen, as a result of rotation of the system, is zero. In fact, within a closed cavity in a rotating superconductor, a field $H_{rot}=2mc/e$. OMEGA is generated. Therefore any sample of a material having gamma$=2mc/e$ would experience the effect of a total field $H=H_{rot}+2mc/e \times$ OMEGA $=0$.

The present invention, however, makes use of the difference between the gamma factors of ferromagnetic materials and superconducting materials.

In the case of the device illustrated in the appended drawings, if the container 8 rotates about its axis 18 at a constant angular velocity OMEGA, each ferromagnetic bar 28 of the device 20 is magnetized both by the magnetic field equivalent to the rotation, $H=2mc/$ge OMEGA, and by the magnetic field generated within the casing 1 by the effect of the rotation on the casing itself $H_{rot}=2mc/e \times$ OMEGA. The net effect is that of a field 2 mc/e $(1/g-1)$ OMEGA, which is almost equal to mc/e $\times$ OMEGA, since, as already stated, g is approximately 2. The measurement of the magnetization of each ferromagnetic bar 28 therefore enables a measure of the angular velocity of the rotation to be derived.

In practice, the SQUID magnetometer measures a variation in magnetic induction which is equal to:

DELTA PHI$=(2$ mc/e$)$ $(1/g-1)$ $(1-s/S)$
[CHIs/[1+f(CHI))]$\} \times$DELTA (OMEGA LAMBDA n)   (1)

This formula relates to the theoretical case of a cylindrical casing and a single ferromagnetic bar situated at its center. The symbols s and S indicate the sections of the bar and of the cylindrical screen respectively, and CHI is the effective initial magnetic susceptibility of the bar; f(CHI) is a function of the susceptibility and of the geometry of the device, which at the limit, when the heights of the screen and of the bar are infinite, becomes $f(CHI) = CHI_s/S$; finally n is the unit vector of the axis of symmetry of the system.

There is, however, no variation in flux for variations in the magnetic field caused by sources outside the screen in the limit case of a perfect screen. The latter limit $s^1$ may be quite approximate if one considers that, without particular precautions, a single superconducting screen can attentuate external fields of approximately 200 dB.

It should be noted that, since the device is based on a SQUID, the signal output thereby is given by the equation (1) minus an additional constant. A constant angular velocity is thus determined by varying the orientation of the device in the reference whose rotation is to be measured and measuring the consequent variation in the output signal. It should also be noted that although the equation (1) was obtained for a constant OMEGA, it remains valid for values of OMEGA which vary more slowly than the pass-band of the instrument.

The structure of the ferromagnetic bars 28, which was described with reference to FIG. 3, enables particularly accurate measurements to be obtained for the reasons explained below.

In normal conditions, a SQUID is a magnetic flux meter and has been used up to sensitivities of approximately $10^{-6}$ $PHI_0$/square root of Hz, where $PHI_0 = hc/2e$ is the so-called flux quantum and the value of $PHI_0 = 2 \times 10^{-15}$ webers $= 2 \times 10^{-7}$ gauss cm$^2$. However, the noise of a SQUID is a function of its inductance and it is thus clear that if it is coupled to a magnetic coil of high permeability this will modify its noise pattern substantially. Moreover, it must be remembered that the effective permeability of such magnetic coils is a function of frequency. It is high at low frequencies and is greatly attenuated at frequencies above a cut-off frequency which is characteristic of the material. It is possible to calculate the excess thermal noise spectrum caused by the presence of the ferromagnetic coil on the basis of a simple model in which the susceptibility of the magnetic coil has assigned to it a single pole in the frequency domain. In these conditions, the inductance of the SQUID becomes:

$$L(omega) = L_0/(1 + j\, omega\, tau) + L_{infinity} \quad (2)$$

The ferromagnet creates in the SQUID an excess flux whose power spectrum S(omega) is given by:

$$S(omega) = \frac{4K_B T L_0 [tau + (L_0 + 2L_{infinity})/R]}{1 + omega^2 tau^2} \quad (3)$$

where T is the absolute temperature, $K_B$ is Boltzmann's constant, R is the junction resistance of the SQUID and the other parameters are the same as in equation (2). The calculation can be extended if the SQUID is coupled to the ferromagnet through a superconducting circuit formed by two separate windings of which one is coupled inductively to the SQUID and the other to the ferromagnet. If the second winding which is coupled to the SQUID, has an inductance $L_s$ and a coefficient of mutual induction M with the SQUID, then the noise flux in the SQUID has the spectrum $$S(omega) = \frac{[4K_B T M^2 L_0 tau/(L_S + L_0 + L_{infinity})^2]}{(1 + omega^2 tau^2_{eff})} \quad (4)$$

where $tau_{eff} = \frac{tau(L_S + L_{infinity})}{L_S + L_{infinity} + L_0}$

It can thus be seen that, if the noise is to be reduced, it is necessary for tau (the cut-off time) to be as low as possible, that is, the cut-off frequency should be as high as possible.

The cut-off time does not generally arise from the intrinsic cut-off of the permeability, which occurs at much higher frequencies than those observed, but rather from the eddy currents which prevent penetration of the alternating magnetic field if its frequency is greater than approximately $1/(2pi\, mu\, delta\, 1^2)$ where delta is the electrical conductivity of the material, mu is its permeability and 1 is the typical linear dimension of the paths of the currents, for example, for a homogeneous cylindrical sample, the radius. This is the so-called skin effect in conductors.

In order to avoid this problem, each ferromagnetic bar 28 of the device according to the invention is constituted by a lamination of thin magnetic strips intercalated with even thinner insulating layers. This leads to a reduction in the cut-off time, which is inversely proportional to the square of the thickness of the magnetic layers, whilst the permeability decreases linearly, being proportional to the ratio of the thickness of the insulating layers to the thickness of the magnetic layers.

As already seen, a further novel element in the present invention consists of the fact that the device is provided with N separate magnetic coils 28, each produced by the methods explained above. In this configuration, the noise due to the various coils adds up in an incoherent manner, leading to an increase in the signal/noise ratio by a factor of the square root of N. More precisely, in the version in which the magnetic coils, are connected by means of a superconducting transformer, it has been calculated that the signal/noise ratio per band unit at low frequency $R_{nu}$ is:

$$R_{nu} = PHI'[N/(4K_B T L_0 TAU)]^{\frac{1}{2}} \quad (5)$$

where PHI' is the flux seen by a single winding connected to a single magnetic coil and $L_O$ also relates to a single winding.

Naturally, the principle of the invention remaining the same, the constructional details and forms of embodiment may be varied widely with respect to that described and illustrated purely by way of example, without thereby departing from the scope of the present invention.

For example, it is possible to provide several superconducting screens with staggered apertures for the passage of the electrical cables instead of the single superconducting casing 1. It is also possible to provide an outer ferromagnetic screen for further attenuating the field, enabling the whole device to be kept in a weak field even during stages in which the apparatus is being cooled. This is important to keep the ferromagnets within the initial portion of their magnetization curves. The presence of an external ferromagnetic screen does not alter the response of the system since any weak fields produced within it by rotation, being true magnetic fields, are also screened by the inner, superconducting screens.

Finally, it is possible to provide a calibration solenoid wound around the assembly of magnetic coil. By means of this solenoid, it is possible to apply a uniform field H to all the coils. It is easy to calculate, for simplicity, for a single coil, that a current I in the solenoid causes a flux variation in the SQUID given by:

$$\text{DELTA PHI} = kIn_O/l(1-s/S) \cdot [\text{CHI}s/[1+f(\text{CHI})]] \quad (6)$$

where $n_O$ is the number of turns which form the solenoid, l is its length, k is a constant which depends only on the geometry of the system and CHI has been assumed to be much greater than 1 as is always permissible in this case. In the case of an infinite solenoid $k=1$. A negative feedback current proportional to the variation in flux in the SQUID is made to flow in the solenoid. It will be seen below that the response of the system thus becomes independent of the susceptibility of the material, which is subject to fluctuations which may affect the measurement. In SQUID magnetometers with a so-called open-chain configuration, the output of the last stage of the amplification chain is a periodic voltage signal $V_O$ in the magnetic flux applied to the SQUID. The period is $\text{PHI}_O$. In the present device, this signal is delivered to the solenoid through a resistance R thus generating a signal which accords with a negative feedback pattern. For small signals the characteristic voltage flow of the SQUID may be linearised as $$V_O = G \text{ DELTA PHI} \quad (7)$$

where DELTA PHI is the displacement of the flux from its operating point and G is the gain for small signals. If this voltage is made to drop in the resistance R in series with the solenoid, this generates a current $I = V_o/R$ and consequently a flux variation $$\text{DELTA PHI} = (V_o/R)kn_O/l(1-s/S)\{\text{CHI}s/[1+f(\text{CHI})]\} \quad (8)$$

If a rotation signal is also present, as in (1), then the following equation is obtained for $V_O$ $$V_0 = \frac{G(2mc/e)(1/g - 1)(1 - s/S) \cdot \{CHIs/[1 = f(CHI)]\}n\text{OMEGA}}{\{1 + (G/R)(n_0/l)(1 - s/S)\{CHIs/[1 + f(CHI)]\}\}} \quad 45$$

which for high gains becomes $$V_O = [l/(n_0 R)] \cdot (1/g - 1)(2mc/e) \text{ OMEGA } n \quad 50$$

which does not depend on CHI.

The negative feedback arrangement of the calibration solenoid therefore achieves a response which is independent of variations in the permeability of the magnetic materials.

What is claimed is:

1. A cryogenic gyroscope, comprising:
   a closed rigid casing made of a superconducting material
   cooling means for keeping said casing at a temperature no higher than its critical superconducting temperature; and
   a rotation detector device supported rigidly within said casing by the walls thereof and comprising at least one component of ferromagnetic material adapted to be magnetized by rotation of said casing, said ferromagnetic material being constituted by a plurality of ferromagnetic strips intercalated with layers of electrically insulating material wherein said ferromagnetic strips are adapted to be operatively connected to a SQUID magnetometer for emitting signals indicative of magnetization of said ferromagnetic component.

2. A gyroscope as claimed in claim 1, wherein said layers of insulating material are thinner than said strips of ferromagnetic material.

3. A gyroscope as claimed in claim 1, wherein said gyroscope includes; a plurality of said ferromagnetic components in the form of bars; a plurality of support plates which are superposed and spaced apart and to which said bars are applied in parallel rows; and a plurality of superconducting windings each wound around a respective bar with all said windings adapted to be connected in parallel to said SQUID magnetometer.

4. A method for detecting the angular velocity of a rigid system rotating around an axis which comprises the steps of:
   providing at least one component of ferromagnetic material including a plurality of ferromagnetic strips intercalated with layers of electrically insulating material, said component being supported rigidly by said systems so that said component becomes magnetized as a result of rotation of the system;
   providing a closed rigid casing of a super conducting material around said at least one component of ferromagnetic material;
   maintaining said casing at a temperature not higher than its critical super conducting temperature so that said component of ferromagnetic material is prevented from being magnetized by magnetic fields existing outside said casing;
   measuring the magnetization of said component wherein said magnetization of the ferromagnetic component is the result of the magnetization caused by the rotation of the system and the magnetization induced by said casing when the latter becomes magnetized itself because of the rotation of said system; and
   calculating the angular velocity of the system as a function of the measured magnetization of said ferromagnetic component.

* * * * *